(12) United States Patent
Christenson et al.

(10) Patent No.: US 11,427,332 B2
(45) Date of Patent: Aug. 30, 2022

(54) FLIGHT DECK CONSTANT OUTSIDE AIRFLOW FOR ALL FLIGHT CONDITIONS

(71) Applicant: The Boeing Company, Chicago, IL (US)

(72) Inventors: Brian C. Christenson, Chicago, IL (US); Warren A. Atkey, Chicago, IL (US); Bryce A. Tillack, Chicago, IL (US)

(73) Assignee: The Boeing Company, Chicago, IL (US)

( * ) Notice: Subject to any disclaimer, the term of this patent is extended or adjusted under 35 U.S.C. 154(b) by 319 days.

(21) Appl. No.: 16/719,466

(22) Filed: Dec. 18, 2019

(65) Prior Publication Data

US 2021/0188446 A1  Jun. 24, 2021

(51) Int. Cl.
*B64D 13/04* (2006.01)
*B64D 13/06* (2006.01)

(52) U.S. Cl.
CPC ............. *B64D 13/04* (2013.01); *B64D 13/06* (2013.01); *B64D 2013/0655* (2013.01)

(58) Field of Classification Search
CPC .............. B64D 13/04; B64D 13/06; B64D 2013/0655; B64D 2013/0618; B64D 2013/0644; B64D 2013/0625; B64D 2013/0692; B64D 13/02; Y02T 50/50
USPC .......................................................... 454/73
See application file for complete search history.

(56) References Cited

U.S. PATENT DOCUMENTS

| | | | | |
|---|---|---|---|---|
| 5,253,484 | A | * | 10/1993 | Corman ................. B64D 13/00 62/239 |
| 5,511,385 | A | * | 4/1996 | Drew ..................... B64D 13/06 62/172 |
| 5,516,330 | A | | 5/1996 | Dechow et al. |
| 6,004,382 | A | * | 12/1999 | Pikesh ................ F02M 35/022 55/385.3 |
| 10,137,317 | B2 | | 11/2018 | Armatorio et al. |
| 2001/0032472 | A1 | | 10/2001 | Buchholz et al. |
| 2003/0189132 | A1 | * | 10/2003 | Brady ...................... B60H 1/00 244/118.5 |

(Continued)

OTHER PUBLICATIONS

Extended European Search Report prepared by the European Patent Office in application No. EP 20 20 9420.7 dated May 18, 2021.

(Continued)

*Primary Examiner* — Steven S Anderson, II
*Assistant Examiner* — Andrew W Cheung
(74) *Attorney, Agent, or Firm* — McDonnell Boehnen Hulbert & Berghoff LLP

(57) ABSTRACT

Example implementations for maintaining airflow into a flight deck of an aircraft are described herein. An example method may involve detecting, at a computing system and using a flow sensor, a decrease in a level of airflow entering into the flight deck such that the level of airflow is below a threshold level. The aircraft may include air sources configured to direct airflow towards occupancy areas (e.g., the cabin and flight deck) of the aircraft. The method may further involve adjusting a control valve to cause an increase in the level of airflow entering into the flight deck based on detecting the decrease in level of airflow entering into the flight deck. The control valve may be configured to enable and disable airflow from entering into the flight deck.

20 Claims, 7 Drawing Sheets

(56) References Cited

U.S. PATENT DOCUMENTS

| | | | |
|---|---|---|---|
| 2006/0059927 A1* | 3/2006 | Zywiak | B64D 13/06 62/172 |
| 2008/0283663 A1* | 11/2008 | Space | B64D 13/06 244/118.5 |
| 2013/0231035 A1 | 9/2013 | Desmarais et al. | |
| 2018/0065752 A1* | 3/2018 | Franco | B64D 13/06 |
| 2018/0086437 A1* | 3/2018 | Pastouchenko | B64C 21/04 |
| 2018/0111693 A1* | 4/2018 | Shea | B64D 13/06 |
| 2019/0152609 A1 | 5/2019 | Kirkbridge | |
| 2021/0122478 A1* | 4/2021 | Mackin | B64D 13/08 |

OTHER PUBLICATIONS

Bahrami, "Flightdeck Protection (Smoke and Fumes)", Advisory Circular, U.S. Department of Transportation, Federal Aviation Administration, Oct. 24, 2008.

\* cited by examiner

500

```
┌─────────────────────────────────────────────────────────────────────┐
│  DETECT A DECREASE IN A LEVEL OF AIRFLOW ENTERING INTO THE FLIGHT   │
│  DECK SUCH THAT THE LEVEL OF AIRFLOW IS BELOW A THRESHOLD LEVEL     │
└─────────────────────────────────────────────────────────────────────┘
                                                                  ─ 502
                                  │
                                  ▼
┌─────────────────────────────────────────────────────────────────────┐
│  BASED ON DETECTING THE DECREASE IN THE LEVEL OF AIRFLOW ENTERING   │
│  INTO THE FLIGHT DECK, ADJUST A CONTROL VALVE TO CAUSE AN INCREASE  │
│  IN THE LEVEL OF AIRFLOW ENTERING INTO THE FLIGHT DECK              │
└─────────────────────────────────────────────────────────────────────┘
                                                                  ─ 504
```

FIGURE 5

```
                                  ▼
┌─────────────────────────────────────────────────────────────────────┐
│     DETECT, USING A SENSOR, NOXIOUS GAS IN A CABIN OF THE AIRCRAFT  │
└─────────────────────────────────────────────────────────────────────┘
                                                                  ─ 602
                                  │
                                  ▼
┌─────────────────────────────────────────────────────────────────────┐
│  BASED ON DETECTING THE NOXIOUS GAS IN THE CABIN, ADJUST A FIRST    │
│  CONTROL VALVE TO PREVENT AIRFLOW FROM ENTERING INTO THE FLIGHT     │
│  DECK FROM THE CABIN                                                │
└─────────────────────────────────────────────────────────────────────┘
                                                                  ─ 604
```

FIGURE 6

FLIGHT DECK CONSTANT OUTSIDE AIRFLOW FOR ALL FLIGHT CONDITIONS

FIELD

The present disclosure relates generally to maintaining airflow within an aircraft, and more particularly to maintaining outside air flow inside the flight deck of the aircraft.

BACKGROUND

Cabin pressurization is a process in which conditioned air is provided into the occupancy areas of an aircraft to create a safe and comfortable environment for passengers and crew during flight. The environmental control system (ECS) of an aircraft can provide air supply, thermal control, and cabin pressurization to maintain the interior environment of the aircraft. For the air supply, air may be bled from gas turbine engines at the compressor stage and then subsequently cooled, humidified, and mixed with recirculated air (if necessary) prior to distribution throughout the aircraft by the ECS. As such, it is desired for the ECS of an aircraft to provide a healthy and comfortable environment from the time crew members and passengers first board for a flight until all passengers and crew members deplane after a flight. This includes a desire for the air supply to be able to continuously supply air from outside the aircraft to the flight deck during all conditions to ensure optimal conditions for piloting the aircraft.

SUMMARY

In one example, a system for maintaining airflow into a flight deck of an aircraft is described. The system includes a plurality of air sources, where each air source is configured to direct airflow towards occupancy areas of the aircraft. The system also includes a control valve configured to enable and disable airflow from entering into the flight deck, and a computing system. The computing system is configured to detect a decrease in the level of airflow entering into the flight deck such that the level of airflow is below a threshold level. In addition, the computing system is further configured to adjust the control valve to cause an increase in the level of airflow entering into the flight deck based on detecting the decrease in the level of airflow entering into the flight deck.

In another example, a method for maintaining airflow into a flight deck of an aircraft is described. The method involves detecting, at a computing system, a decrease in a level of airflow entering into the flight deck such that the level of airflow is below a threshold level. The aircraft includes a plurality of air sources with each air source configured to direct airflow towards occupancy areas of the aircraft. The method further involves, based on detecting the decrease in level of airflow entering into the flight deck, adjusting a control valve to cause an increase in the level of airflow entering into the flight deck. The control valve is configured to enable and disable airflow from entering into the flight deck.

In an additional example, a non-transitory computer-readable medium is described. The non-transitory computer-readable medium is configured to store instructions, that when executed by one or more processors, cause a computing system to perform one or more of the functions of the above method.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 5 shows a flowchart of a method, according to an example implementation.

FIG. 6 shows a flowchart of another method for use with the method shown in FIG. 5, according to an example implementation.

DETAILED DESCRIPTION

Figure 1:
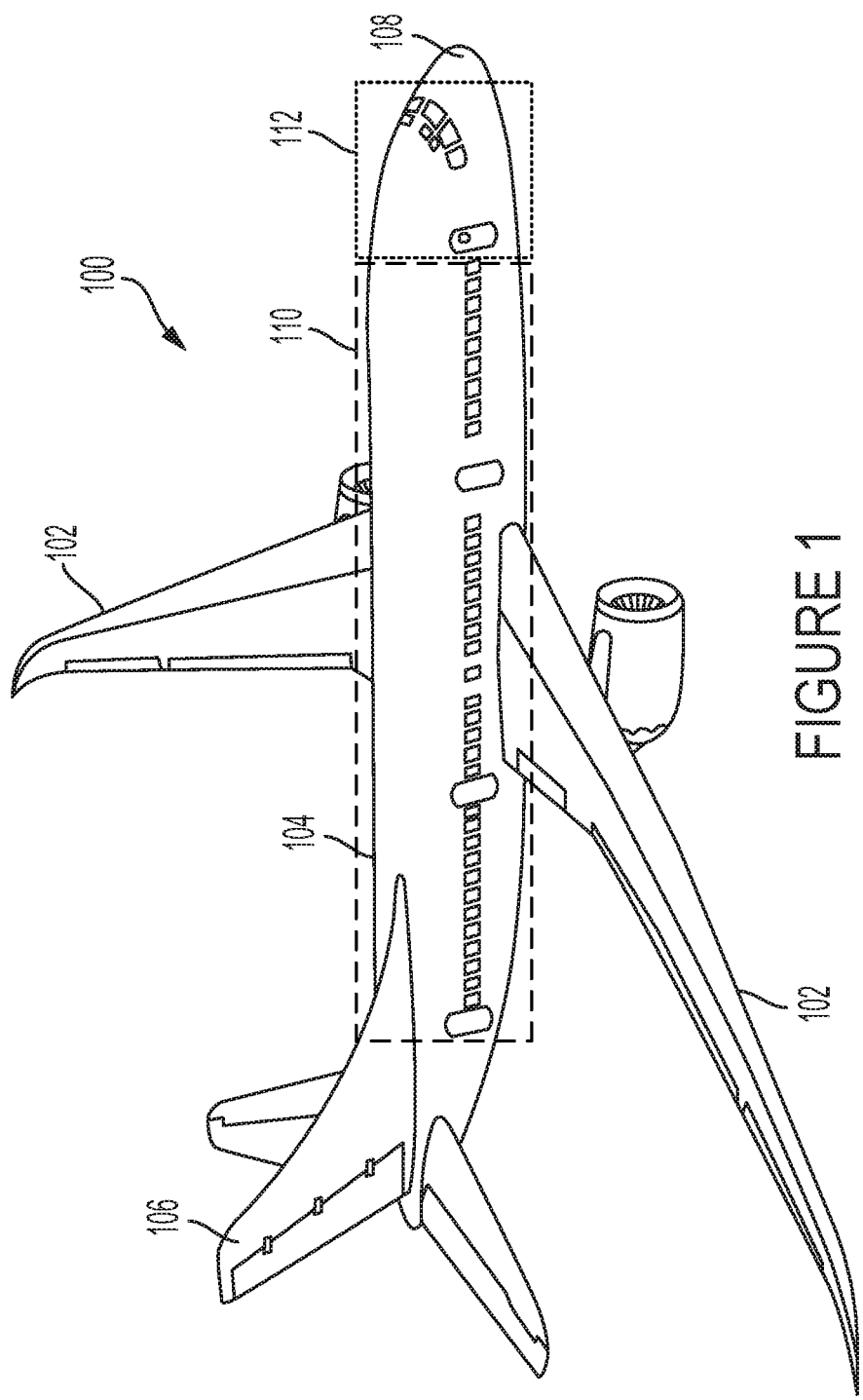
FIG. 1 illustrates a perspective view of an aircraft, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

An aircraft typically provides a mixture of outside air and recirculated air to the occupancy areas of the aircraft, such as the flight deck and the cabin. The mixture of both outside air and recirculated air is used to regulate both the temperature and humidity inside the occupancy areas to make flights more comfortable for passengers and crew. As such, the air supply might be bled from the compressor sections of the engine. The compressed air can be very hot, but it avoids any contact with the combustion gasses of the engine. From the compressors, the air can be directed into air-conditioning packs for cooling, which then further directs the conditioned air as airflow into the cabin and the flight deck through louvers, vents, and gaspers above the seats.

To ensure optimal operating conditions, it might be desired for the air supply system of an aircraft to be able to provide airflow to the flight deck such that positive pressure relative to the cabin is maintained for all dispatchable and flight conditions. In particular, the airflow maintaining positive pressure in the flight deck relative to the cabin may be fresh air obtained from outside the aircraft. By having such an air supply configuration within an aircraft, the flight deck can offer a safe environment for operation of the aircraft even during undesirable situations, such as during an air-conditioning pack failure or detection of noxious gas within the aircraft's cabin.

Example embodiments describe techniques for ensuring outside airflow into the flight deck of an aircraft during various flight conditions. An example air supply system may be configured to enable outside air to be delivered to an aircraft's flight deck to ensure optimal operation conditions for the pilot or pilots of the aircraft. In addition, the air supply system may be capable of making adjustments in response to different conditions to continuously provide fresh airflow into the flight deck.

In some example embodiments, a computing system or another type of a control unit may detect a decrease in the level of airflow entering into the flight deck. For instance, a flow sensor or another type of sensor can capture measurements that can be used to detect that the level of airflow entering into the flight deck is below a threshold level of airflow. In some examples, a combination of multiple sensors may be used to detect the decrease in the level of airflow entering into the flight deck. Based on detecting the decrease in the level of airflow entering into the flight deck, the computing system (or another control unit) may adjust a control valve to cause an increase in the level of airflow entering into the flight deck. The control valve may be configured to enable and disable airflow from entering into the flight deck. As such, adjusting the control valve may enable more airflow to enter into the flight deck.

In some embodiments, a system for maintaining airflow into a flight deck of an aircraft may include air sources, sensors (e.g., one or more flow sensors), and control valves. These components may be part of an ECS of the aircraft. Within the system, each air source may direct airflow towards the aircraft's occupancy areas, such as the cabin and the flight deck. As such, a computing system or another type of control mechanism may perform operations to ensure that airflow is maintained into the flight deck to enable the crew to safely operate the aircraft in all conditions.

The operations performed by the computing system may involve detecting a decrease in the level of airflow entering into the flight deck using a sensor, such as a flow sensor. A flow sensor is a type of sensor configured to measure the level of airflow passing through an area, such as the level of airflow entering into the flight deck. As such, the computing system may monitor levels of airflow entering into the flight deck and/or other occupancy areas using measurements from one or more flow sensors.

When the computing system detects a decrease in the level of airflow entering into the flight deck such that the level of airflow is below a threshold level, the computing system may adjust one or more control valves to cause an increase in the level of airflow entering into the flight deck. Particularly, the computing system may cause adjustments to the air supply system to ensure that the level of airflow entering into the flight deck meets the threshold level. As such, the threshold level can vary within examples. In some examples, the threshold level may be set at a level that results in the flight deck receiving airflow with positive pressure relative to the cabin pressure when the threshold level is satisfied. In another example, the threshold level may depend on the type of aircraft.

In some situations, noxious gas may be detected within the cabin of the aircraft. For instance, one or more sensors may detect the presence of unwanted gas, smoke, and/or other substances within the cabin. Since the cabin and flight deck are positioned proximate within the aircraft, the computing system may be configured to prevent the noxious gas or other unwanted substances from exiting the cabin and entering into the flight deck by adjusting one or more control valves. Particularly, the adjustments may enable the noxious gas to exit the cabin in a way that avoids directing the noxious gas into the flight deck. In addition, the adjustments of the control valves may enable fresh air from outside the aircraft to be conditioned and directed into the flight deck to ensure that the flight deck receives a continuous supply of fresh air. Upon detection of noxious gas or other undesirable gases (e.g., smoke) within the cabin or another area of the aircraft, the computing system may request input to adjust or automatically adjust the level of airflow entering into the flight deck by adjusting one or more control valves, fans, and/or other mechanisms. In some instances, the computing system may provide suggestions for a pilot or another crew to review and select from to increase the airflow entering into the flight deck.

In some instances, the computing system may also disable one or more fans to prevent recirculated airflow from exiting the cabin and entering into the flight deck from the cabin. These fans may be configured to recirculate airflow within the cabin. As such, disabling one or more of the fans may help prevent recirculated cabin airflow, including an unwanted gas or substance within the cabin, from entering into the flight deck from the cabin.

In some examples, the aircraft's crew or a passenger may notice the presence of the noxious gas and alert the pilots or other members of the crew who can provide controls to the aircraft's systems to prevent noxious gas from reaching the flight deck. For example, the crew may have input controls that can adjust control valves and perform other operations (e.g., power fans on or off) to manipulate the air supply system of the aircraft.

Within other embodiments, the computing system may ensure that the level of airflow entering into the flight deck meets the threshold level by adjusting one or more control valves, fans, and/or other mechanisms. For instance, the computing system may adjust one or more control valves to enable an increase of airflow directed towards the flight from one or more air-conditioning packs. An air-conditioning pack may receive air from outside the aircraft and supply the air in a conditioned state as airflow towards one or more occupancy areas (e.g., the flight deck and the cabin).

In some cases, the computing system may use one or more boost fans to help manipulate airflow within the aircraft. For example, the computing system may use one or more boost fans to propel airflow supplied by one or more air-conditioning packs away from the cabin and towards the flight deck. This strategy may ensure that the flight deck receives at least the threshold level of outside air conditioned and supplied by the air-conditioning packs.

Some examples may involve making adjustments in response to an air source malfunctioning or operating undesirably. For instance, the computing system may detect a malfunctioning air source based on a drop in the airflow entering into the flight deck (or the cabin) and responsively determine which air source is causing the drop. The computing system may use sensor measurements to determine which air source is causing the air supply issue and responsively adjust one or more control valves based on determining the problematic air source. For example, the computing system may adjust a first control valve to prevent airflow from being supplied to the flight deck by the malfunctioning air source and adjust a second control valve to increase airflow entering into the flight deck from another air source.

Referring now to the Figures, FIG. 1 illustrates a perspective view of an aircraft, according to an example implementation. The aircraft 100 is shown implemented with a set of wings 102, a fuselage 104, a tail 106, and a nose 108. In other embodiments, the aircraft 100 can have other configurations.

In addition, FIG. 1 shows a position of a cabin 110 and a flight deck 112 of the aircraft 100. The cabin 110 and the flight deck 112, together collectively, make up the occupancy areas of the aircraft 100 where passengers and crew may occupy during flight. In particular, passengers may sit within the cabin 110 while pilots operate the aircraft from within the flight deck 112. The cabin 110 and the flight deck 112 may be separated by a cockpit door and may receive air supply from one or more of the same air sources, such as a set of air-conditioning packs.

Figure 2:
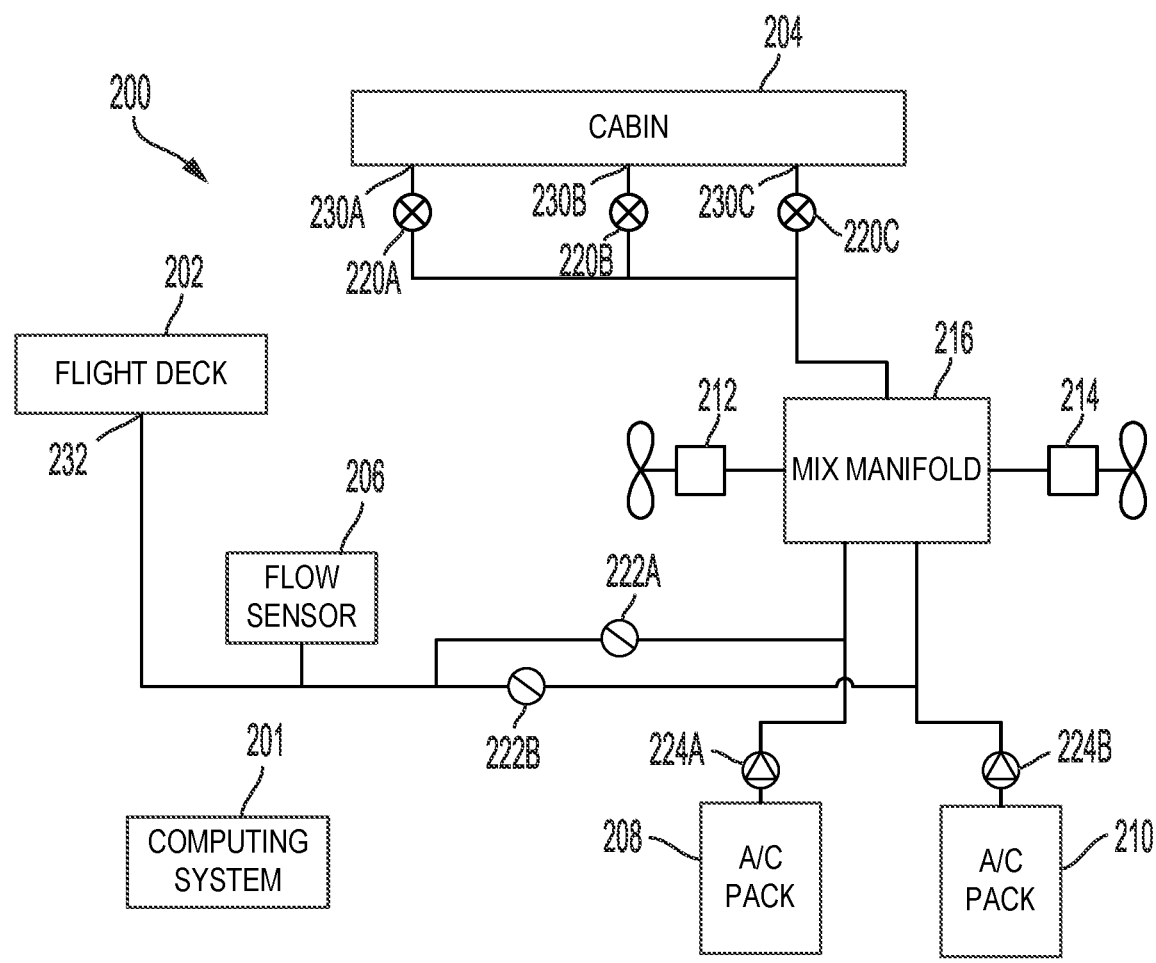
FIG. 2 illustrates a system for airflow control, according to an example implementation.

FIG. 2 illustrates a system for airflow control, according to an example implementation. The system 200 includes a computing system 201, a flight deck 202, a cabin 204, a flow sensor 206, air-conditioning packs 208, 210, fans 212, 214, and mix manifold 216. In addition, the system 200 also includes control valves, such as shutoff valves 220A, 220B, 220C, flow regulating shutoff valves 222A, 222B, and bulkhead check valves 224A, 224B. In the example illustrated in FIG. 2, specific types of control valves are shown used within the system 200. In other examples, other arrangements with different types of control valves can be used.

The system 200 is designed to enable air from outside the aircraft to be continuously supplied to the flight deck 202 of an aircraft, such as the aircraft 100 shown in FIG. 1. The configuration of the system 200 can enable a reliable supply of fresh air into the flight deck 202 in all flight conditions, including when a crew procedure is performed with any outside air source in operation.

The computing system 201 may perform one or more control systems within the system 200. For instance, the computing system 201 may adjust control valves, detect changes in airflow based on sensor measurements, and perform other operations described herein. In other examples, the system 200 may include another type of control mechanism, such as a different control unit or mechanical controls. For instance, the system 200 may not include the computing system 201 in another example embodiment.

The flight deck 202, also known as a cockpit, is an area of an aircraft where one or more pilots may control the aircraft. The flight deck 202 may be positioned near the front of the aircraft similar to the position of flight deck 112 located near the nose 107 of the aircraft 100 shown in FIG. 1. In addition, the flight deck 202 may be physically separated by a boundary (e.g., a door) from the cabin 204 of the aircraft. As a result, each occupancy area may have different inlets for receiving airflow from the air supply of the aircraft.

As shown in FIG. 2, the flight deck 202 includes a discharge outlet 232 configured to enable air to enter into the flight deck 202. In some instances, the discharge outlet 232 may also serve as outlets for air to exit from an occupancy area (e.g., the discharge outlet 232 may serve as an outlet for air to exit from the flight deck 202). The system 200 may include outlets at the flight deck 202 and the cabin 204 that are not shown in FIG. 2.

In addition to the flight deck 202, the cabin 204 is another occupancy area within an aircraft. Particularly, the cabin 204 may be an area within the fuselage 104 of the aircraft 100 shown in FIG. 1 for passengers to occupy during flight. In many aircrafts, the cabin 204 may include seats for passengers to utilize during flight.

The total volume of the cabin 204 may exceed the flight deck 202 within some aircrafts. In particular, passenger jetliners and other types of aircrafts may include substantially larger cabins 204 than the flight deck 202 (e.g., the cabin 204 might be four times the space of the flight deck 202). The larger size of the cabin 204 may enable more passengers to occupy the cabin 204 during flight, whereas the flight deck 202 may be designed to provide space for one or more pilots.

As a result of the size difference, the cabin 204 may include more discharge outlets than the flight deck 202. For instance, in some types of aircrafts, the flight deck 202 may include a single air supply inlet and the cabin 204 may include multiple air supply inlets. As such, each discharge outlet may include a control valve for manipulating the air that flows out of the inlet and into the cabin 204. For example, the system 200 is shown with shutoff valves 220A, 220B, 220C positioned proximate to the discharge outlets 230A, 230B, 230C, respectively. The discharge outlets 230A, 230B, 230C may be configured to supply airflow into the cabin 204 from one or more sources, such as air-conditioning packs 208, 210 and fans 212, 214.

The flow sensor 206 represents an example sensor that the system 200 may use to measure airflow within the air supply. Particularly, the flow sensor 206 may have a position within the system 200 that enables the flow sensor 206 to measure the level of airflow (e.g., the pressure of air) entering into the flight deck 202 via the discharge outlet 232 (e.g., a nozzle). The flow sensor 206 may provide measurements to a control system (e.g., the computing system) enabling the control system to adjust the rate of airflow entering into the flight deck 202 via adjusting one or more control valves within the system 200. In other examples, the system 200 may include additional flow sensors, which may be located at various positions relative to the flight deck 202 and the cabin 204.

The system 200 includes different air sources configured to provide airflow (or direct airflow) within the air supply system of the aircraft, including air-conditioning packs 208, 210, and fans 212, 214. In other examples, the system 200 may include other arrangements of one or more air sources. For instance, the quantity, type, and positions of air sources may depend on the type and size of the aircraft.

Each air-conditioning packs 208, 210 may be configured to receive air from outside the aircraft and supply the air in a conditioned state as airflow towards one or more occupancy areas (e.g., the flight deck and the cabin). As such, the air-conditioning packs 208, 210 may obtain and supply fresh outside air into the air supply controlled by the system 200 within the aircraft. As shown, the air conditioned by the air-conditioning packs 208, 210 may be supplied to the mix manifold 216 within the system 200.

In addition, the fans 212, 214 may also be used to adjust airflow within the air supply of the aircraft. Particularly, each fan 212 may be configured to direct airflow towards certain areas of the aircraft (e.g., the occupancy areas). In some examples, each fan 212, 214 may recirculate air within the air supply, which may include directing airflow towards (or away from) the mix manifold 216. In some examples, the fans 212, 214 may recirculate airflow within the cabin 204.

The mix manifold 216 represents an area of the air supply system where recirculated air and fresh air from the air-conditioning packs 208, 210 may mix. For instance, airflow directed by the air-conditioning packs 208, 210 and the fans 212, 214 may mix together at the mix manifold 216. Mix manifold air may then be subsequently distributed to occupancy areas within the aircraft. When the aircraft is located on the ground before or after a flight, pre-conditioned air may be pumped directly into the mix manifold 216.

The various control valves shown in the system 200 can be used to manipulate the airflow within an aircraft, including increase or decrease the rate of airflow entering into occupancy areas. Each control valve may be used to control airflow by varying the size of the flow passage as directed by a signal from a controller (e.g., the computing system 201). This control aspect can enable the direct control of flow rate and the consequential control of process quantities, such as pressure and temperature level. As such, the control valves can be used to adjust the level of airflow entering (or exiting) occupancy areas (e.g., the flight deck 202 and the cabin 204). In some instances, the use of control valves could also adjust the temperature inside the occupancy areas. For example, one or more control valves may be used to increase or decrease the temperature inside an occupancy area by enabling airflow with a particular temperature to enter (or not enter) inside the occupancy area. The control valves may enable more fresh air to enter into the cabin or flight deck at a colder temperature to decrease the overall temperature of the space.

The control valves included in the system 200 shown in FIG. 2 include the shutoff valves 220A, 220B, 220C, the flow regulating shutoff valves 222A, 222B, and the bulkhead check valves 224A, 224B. These control valves are included to show an example layout of control valves. In other examples, other types of control valves may be included in other arrangements.

The different types of valves may adjust air supply in different ways. The shutoff valves 220A, 220B, 220C may be used to completely shut off airflow from passing through areas occupied by each shutoff valve. For instance, the shutoff valve 220A may prevent airflow from entering into the cabin 204 at the discharge outlet 230A, the shutoff valve 220B may prevent airflow from entering into the cabin 204 at the discharge outlet 230B, and the shutoff valve 220C may prevent airflow from entering into the cabin 204 at the discharge outlet 230C. To illustrate an example, the control system may detect the presence of noxious gas or another unwanted substance (e.g., smoke) within the cabin 204. As such, the control system may adjust one or more of the shutoff valves 220A-220C to prevent airflow from entering into and/or exiting from the cabin 204. This way, the control system can prevent airflow from exiting from the cabin 204 and entering into the flight deck 202 as the flow restriction into the cabin 204 as caused by closure of any one or more of the shutoff valves 220A-220C allows more outside air to be provided to the flight deck 202. The increase in air flow to the flight deck 202 and concurrent decrease of flow entering into the cabin creates a positive pressure in the flight deck 202 relative to that of the cabin, which prevents the harmful gas from migrating from the cabin into the flight deck 202. In addition, the shutoff valves 220A-220C may be adjusted to a more open position to increase airflow entering into the cabin 204.

The flow regulating shutoff valves 222A, 222B may operate as pressure regulators that can reduce the input pressure of airflow to a desired value at outputs. For instance, each flow regulating shutoff valve 222A, 222B may include a restricting element, a loading element, and a measuring element. The restricting element may be a valve that can provide a variable restriction to the airflow, such as a globe valve, butterfly valve, poppet valve, etc. The loading element may be a part that can apply force needed to the restricting element. For instance, the loading element can be provided by a weight, a spring, a piston actuator, an electric motor-driven actuator, or a diaphragm actuator in combination with a spring, etc. The measuring element may be a valve position sensing mechanism, such as a resolver, hall counts, or open/close switches. As shown in FIG. 2, the flow regulating shutoff valves 222A, 222B may regulate airflow entering into (and/or exiting from) the flight deck 202 within the system 200.

The bulkhead check valves 224A, 224B may operate as control valves that utilize one or more bulkhead fittings to couple to the tubing of the airflow system. Each bulkhead check valve 224A, 224B may serve to regulate airflow entering into the air supply system from air-conditioning packs 208, 210 while preventing backflow of the air from occupancy areas into the unpressurized volumes. In some examples, each bulkhead check valve 224A, 224B may enable airflow to travel in one direction (i.e., from each air-conditioning pack 208, 210 into the air supply) and not in the reverse direction.

In some examples, a combination of valves is adjusted to manipulate air supply within the aircraft. For instance, the computing system may adjust one or more of the shutoff valves 220A-220C to decrease airflow from entering into the cabin 204 from the mix manifold 216 and further open one or both of the flow regulating shutoff valves 222A, 222B to increase airflow entering into the flight deck 202 from the mix manifold 216. This arrangement can create a more favorable compartment pressure for the flight deck 202 relative to the compartment pressure for the cabin 204.

In another embodiment, a crew member or passenger on the aircraft may notice smoke, fire, or fumes, which may prompt the pilot (or another crew member) to execute a procedure. During the procedure, both fans 212, 214 may be powered off and the air-conditioning packs 208, 210 may be powered off one at a time. As a result, the airflow entering into the flight deck 202 may be low. To compensate for the decrease in the airflow entering into the flight deck 202, the system 200 may be configured such that one or both of the flow regulating shutoff valves 222A, 222B are opened to increase airflow to the flight deck 202. In addition, one or more of the shutoff valves 220A-220C may be fully closed to decrease airflow from entering into the cabin 204 from the mix manifold 216. Closing one or more of the shutoff valves 220A-220C may enable a redirection of that airflow towards the flight deck 202.

Figure 3:
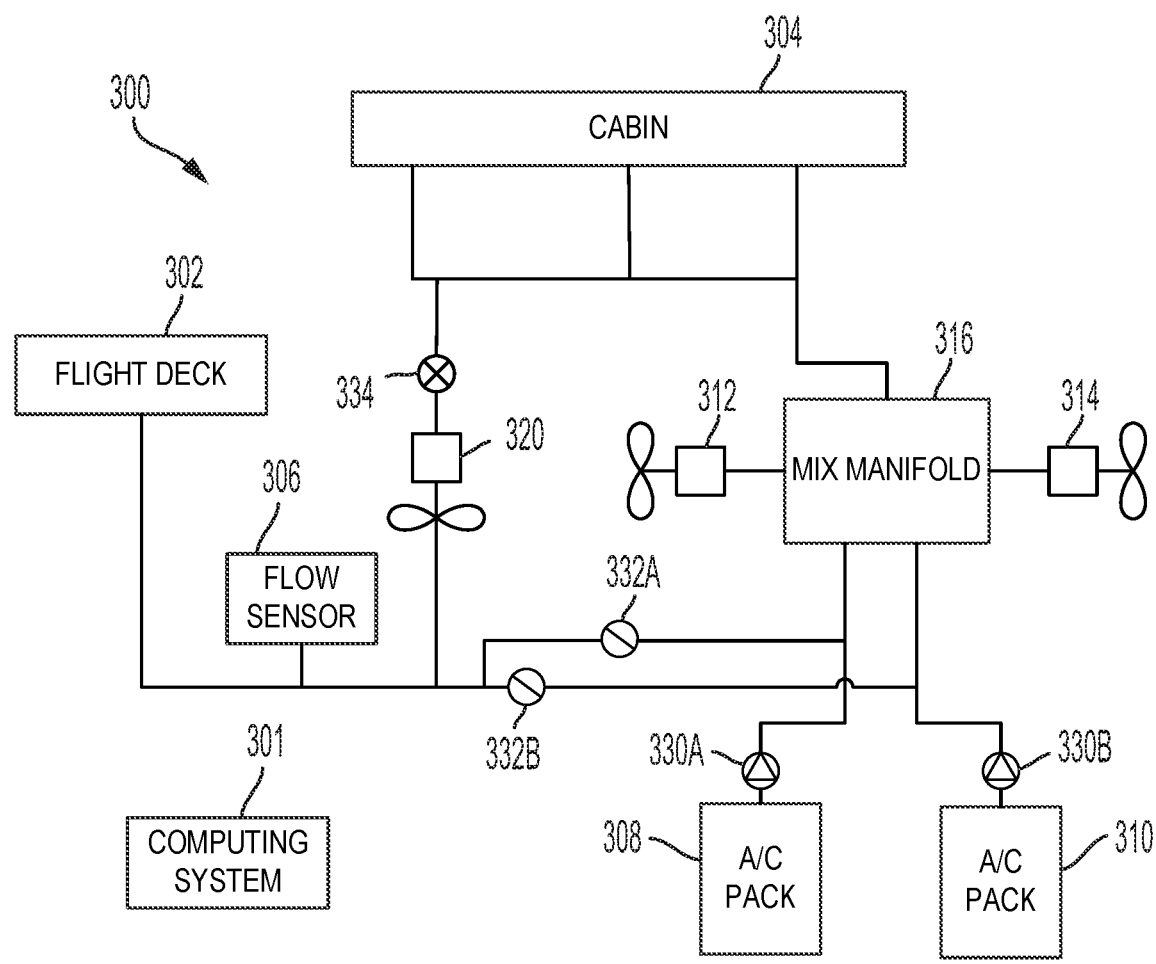
FIG. 3 illustrates another system for airflow control, according to an example implementation.

FIG. 3 illustrates another system for airflow control, according to an example implementation. Similar to the system 200 shown in FIG. 2, the system 300 represents an example arrangement of components that can be used to adjust the airflow provided to occupancy areas of an aircraft. As shown in FIG. 3, the system 300 includes a computing system 301, a flight deck 302, a cabin 304, a flow sensor 306, air-conditioning packs 308, 310, fans 312, 314, a mix manifold 316, and a boost fan 320. In addition, the system 300 also includes control valves, such as bulkhead check valves 330A, 330B, flow regulating shutoff valves 332A, 332B, and a shutoff valve 334. In the example illustrated in FIG. 3, specific types of control valves are shown within the system 200. In other examples, other arrangements of various types of control valves can be utilized within the system 300.

The system 300 is similar to the system 200 illustrated in FIG. 2 with some differences as follows. Particularly, the system 300 includes a boost fan 320 positioned proximate to a shutoff valve 334. This arrangement shown in the system 300 involves using the shutoff valve 334 rather than multiple shutoff valves (e.g., the shutoff valves 220A, 220B, 220C shown in FIG. 2) to control airflow with respect to the cabin 304. The shutoff valve 334 may be used to prevent airflow from exiting the cabin 304 and directly flowing into the flight deck 302. This arrangement can be useful to prevent noxious gas or other unwanted substances from flowing from the cabin 304 into the flight deck 302.

The addition of the boost fan 320 within the system 300 may enable further adjustments to be made to the air supply within the aircraft. For instance, a control system may cause the boost fan 320 to power on and open the shutoff valve 334. These actions may redirect airflow that is intended to supply the cabin 304 towards the flight deck 302. The control system may use the boost fan 320 in response to detecting a decrease in the level of airflow entering into the flight deck 302. In some examples, the computing system may use a combination of adjusting one or more control valves and the boost fan 320 within the system 300 to direct airflow into the flight deck 302.

In an embodiment, a crew member or passenger on the aircraft may notice smoke, fire, or fumes, which may prompt the pilot (or another crew member) to execute a procedure. The procedure may involve adjusting one or more of the flow regulating shutoff valves 332A, 332B to a more open position and also powering on (or increase power to) the boost fan 320 while turning off the fans 312 and 314 providing recirculation. As a result, the procedure may increase airflow entering into the flight deck 302.

In a further embodiment, the shutoff valve 334 within the system 300 may be replaced by a check valve positioned downstream of the boost fan 320. In such a position, the check valve may be configured to open toward the junction of the flight deck 302 supply line associated with the boost fan 320 while the boost fan 320 is powered. As a result, the supply pressure in the flight deck 302 supply line can be lowered relative to the pressure of the cabin 304.

Figure 4:
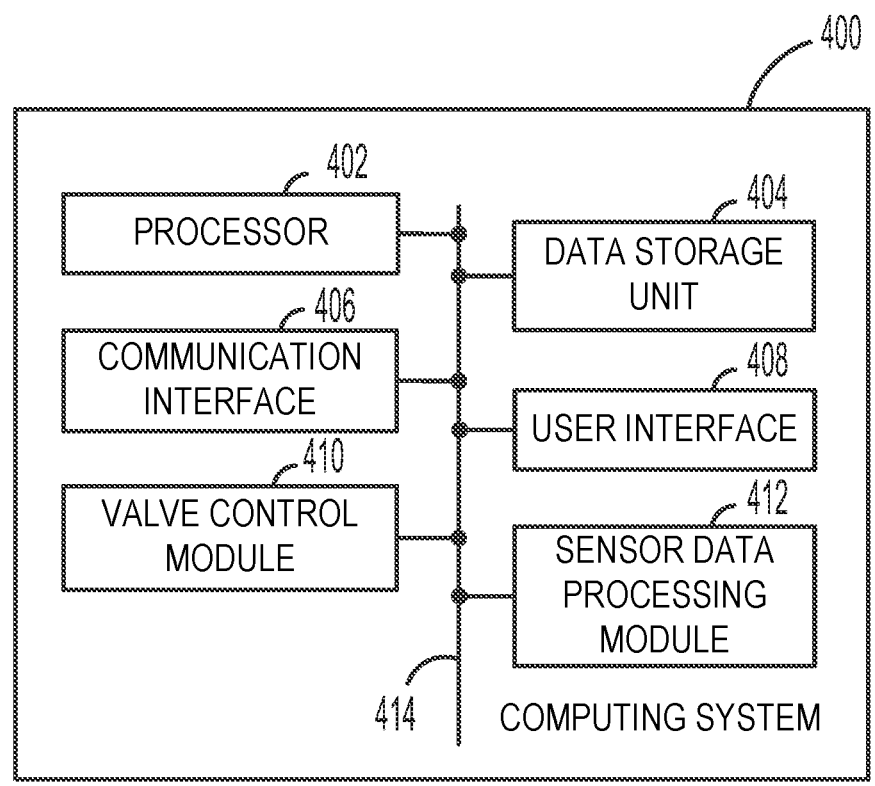
FIG. 4 is a block diagram of a computing system, according to an example implementation.

FIG. 4 is a block diagram of a computing system, according to an example implementation. The computing system 400 may perform various acts and/or functions, such as those described in this disclosure. The computing system 400 may include components, such as a processor 402, a data storage unit 404, a communication interface 406, a user interface 408, a valve control module 410, and a sensor data processing module 412. The components can be connected to each other (or to another device, system, or other entity) via a connection mechanism 414, and can include more or less components in other example implementations. In other embodiments, the computing system 400 may be implemented across multiple computing devices operating within a network. In other examples, a different control mechanism may perform operations related to adjusting airflow within an aircraft.

In this disclosure, the term "connection mechanism" means a mechanism that facilitates communication between two or more devices, systems, or other entities. For instance, a connection mechanism can be a simple mechanism, such as a cable or system bus, or a relatively complex mechanism, such as a packet-based communication network (e.g., the Internet). In some instances, a connection mechanism can include a non-tangible medium (e.g., where the connection is wireless).

The processor 402 may represent one or more general-purpose processors (e.g., a microprocessor) and/or one or more special-purpose processors (e.g., a digital signal processor (DSP)). As such, the processor 402 may include a combination of processors within examples. The processor 402 may perform operations, including processing data received from the other components within the computing system 400 and data obtained from external sources, such sensors (e.g., one or more flow sensors).

The data storage unit 404 may include one or more volatile, non-volatile, removable, and/or non-removable storage components, such as magnetic, optical, or flash storage, and/or can be integrated in whole or in part with the processor 402. As such, the data storage unit 404 may take the form of a non-transitory computer readable medium, having stored therein instructions executable (e.g., compiled or non-compiled program logic and/or machine code) that, when executed by the processor 402, cause the computing system 400 to perform one or more acts and/or functions, such as those described in this disclosure. Such program instructions can define and/or be part of a discrete software application. In some instances, the computing system 400 can execute program instructions in response to receiving an input, such as from the communication interface 406 or the user interface 408. The data storage unit 404 may also store other types of data, such as those types described in this disclosure.

In some examples, the data storage unit 404 may serve as a local storage for information obtained from one or more external sources. For example, the data storage unit 404 may store information obtained from sensors. The data storage unit 404 also can store instructions executable by the processor 402 to perform functions of the computing system 400. For example, any of the modules described herein may take the form of instructions executable by the processor 402 and the instructions can be stored on the data storage unit 404.

The communication interface 406 can allow the computing system 400 to connect to and/or communicate with another entity (e.g., another computing device) according to one or more protocols. In an example, the communication interface 406 can be a wired interface, such as an Ethernet interface or a high-definition serial-digital-interface (HD-SDI). In another example, the communication interface 406 can be a wireless interface, such as a cellular or WI-FI interface. A connection can be a direct connection or an indirect connection, the latter being a connection that passes through and/or traverses one or more entities, such as a router, switcher, or other network device. Likewise, a transmission can be a direct transmission or an indirect transmission. The communication interface 406 may also utilize other types of wireless communication to enable communicating with one or more aircrafts.

The user interface 408 can enable user (e.g., a pilot, crew) to interact with the control system of an air supply of an aircraft, if applicable. As such, the user interface 408 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, the user interface 408 can include hardware and/or software components that facilitate interaction between the computing system 400 and one or more users.

The valve control module 410 represents a component of the computing system 400 that may be used to adjust control valves within the air supply system (e.g., the system 200 or the system 300). For instance, the valve control module 410 may provide control instructions to adjust one or more control valves. In some instances, the valve control module 410 may provide control instructions based on input from the sensor data processing module 412. Control instructions may be provided via wireless communication, wired communication, and/or mechanical controls.

The sensor data processing module 412 represents a component of the computing system 400 that may be used to obtain and analyze sensor data from sensors measuring aspects of the air supply system of an aircraft. For instance, the sensor data processing module 412 may use measurements from flow sensors, sensor measuring control valves, and other sensors to provide input to the valve control module 410.

In some examples, the sensor data processing module 412 may be configured to determine one or more airflow level thresholds for use during monitoring of the air supply system. Particularly, one or more of the airflow level thresholds may be used to ensure that one or more areas (e.g., the flight deck) receives a particular level of airflow during operation of the aircraft, such as a positive airflow that maintains positive pressure in the flight deck with respect to the pressure in the cabin compartment.

To illustrate another example, the sensor data processing module 412 may set a pair of thresholds. A first threshold of the pair may be set to ensure that the flight deck receives airflow consisting of outside air conditioned by one or more air-conditioning packs of the aircraft. A second threshold may be higher than the first threshold and may serve as a limit that indicates when too much outside airflow is being delivered into the flight deck. This way, the computing system 400 may be configured to ensure that the flight deck receives outside airflow that exceeds the first threshold but falls below the second threshold.

FIG. 5 shows a flowchart of a method, according to an example implementation. The method 500 presents an example method for that could be used with the system 200 shown in FIG. 2, the system 300 shown in FIG. 3, and/or performed by the computing system 400 shown in FIG. 4. In other examples, components of the devices and/or systems may be arranged to be adapted to, capable of, or suited for performing the functions, when operated in a specific manner.

The method 500 can include one or more operations, functions, or actions as illustrated by one or more of blocks 502 and 504. Although the blocks are illustrated in a particular order, these blocks may also be performed in parallel, and/or in a different order than those described herein. Also, the various blocks may be combined into fewer blocks, divided into additional blocks, and/or removed based upon the desired implementation.

At block 502, the method 500 involves detecting a decrease in a level of airflow entering into the flight deck such that the level of airflow is below a threshold level. The aircraft may include one or more air sources with each air source configured to direct airflow towards occupancy areas of the aircraft.

In some embodiments, a computing system detects the decrease in the level of airflow entering into the flight deck using a flow sensor. The flow sensor may be configured to measure the level of airflow entering into the flight deck. For instance, the flow sensor may be implemented as the flow sensor 206 shown in FIG. 2 or the flow sensor 306 shown in FIG. 3. In some examples, an ACA may include multiple flow sensors to measure airflow entering and/or exiting from different regions of the aircraft. An ACA of an aircraft may include a first flow sensor to measure airflow with respect to the flight deck and a second flow sensor to measure airflow with respect to the cabin.

In additional embodiments, a computing system detects the decrease in the level of airflow entering into the flight deck based on measurements from a plurality of sensors. For instance, a combination of sensors may provide measurements that can be used to determine that the level of airflow entering into the flight deck decreased.

In some examples, the threshold level may be determined based on sensor data. For instance, the threshold level may ensure that the flight deck 202 is receiving airflow from the air supply system such that positive pressure for the flight deck is maintained relative to the cabin. The threshold level may be set such that the flight deck 202 receives a certain amount of outside air from one or more air-conditioning packs.

At block 504, the method 500 involves adjusting a control valve to cause an increase in the level of airflow entering into the flight deck based on detecting the decrease in the level of airflow entering into the flight deck. The control valve may be configured to enable and disable airflow from entering into the flight deck.

FIG. 6 shows a flowchart of a method for use with the method 500, according to an example implementation. Block 602 involves detecting, using a sensor, noxious gas in a cabin of the aircraft. Block 604 involves adjusting a particular control valve to prevent airflow from exiting the cabin and entering into the flight deck based on detecting the noxious gas in the cabin. The particular control valve can differ within implementations and depending on the cause of the decrease in airflow entering into the flight deck.

Figure 7:
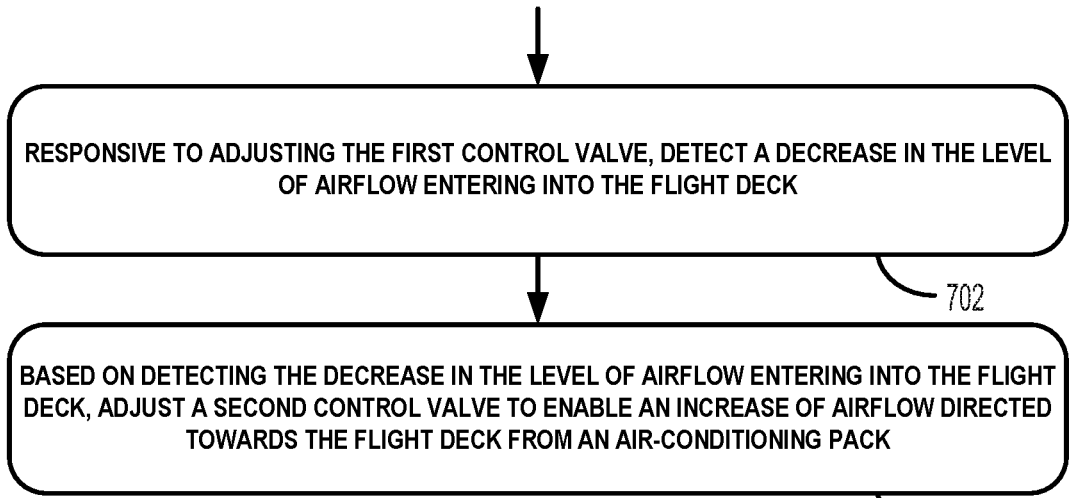
FIG. 7 shows an additional flowchart of a further method for use with the method shown in FIG. 5, according to an example implementation.

FIG. 7 shows another flowchart of a further method for use with the method 500, according to an example implementation. Block 702 involves responsive to adjusting the first control valve, detecting a decrease in the level of airflow entering into the flight deck. Block 704 further involves adjusting a second control valve to enable an increase of airflow directed towards the flight deck from an air-conditioning pack based on detecting the decrease in the level of airflow entering into the flight deck.

Figure 8:
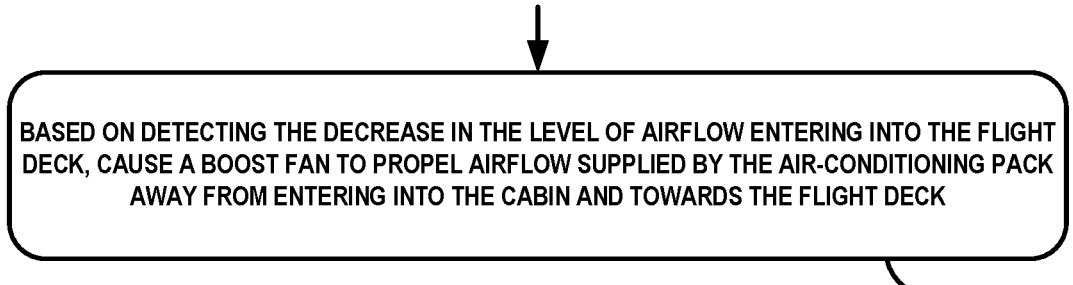
FIG. 8 shows a further flowchart of a method for use with the method shown in FIG. 5, according to an example implementation.

FIG. 8 shows a further flowchart of a method for use with the method 500, according to an example implementation. Block 802 involves causing a boost fan to propel airflow supplied by the air-conditioning pack away from the cabin and towards the flight deck. In some examples, the boost fan may be powered on in response to adjusting one or more control valves.

Figure 9:
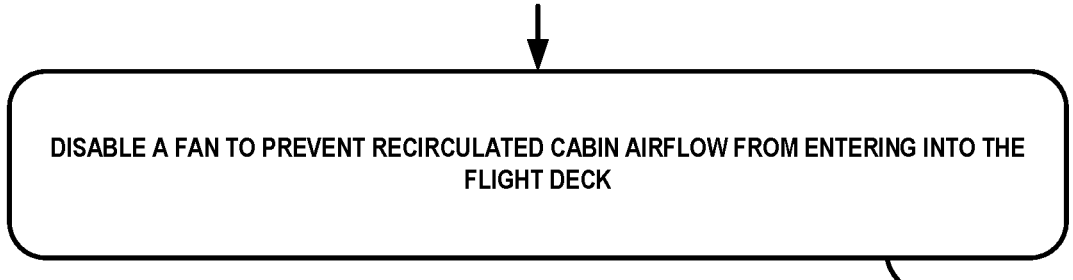
FIG. 9 shows yet another flowchart of a method for use with the method shown in FIG. 5, according to an example implementation.

FIG. 9 shows yet another flowchart of a method for use with the method 500, according to an example implementation. Block 902 involves disabling a fan to prevent recirculating airflow between the flight deck and the cabin. The fan may be configured to recirculate airflow between the cabin back into the cabin. One or more fans may be disabled prior to and/or in response to the adjustment of one or more control valves.

Figure 10:
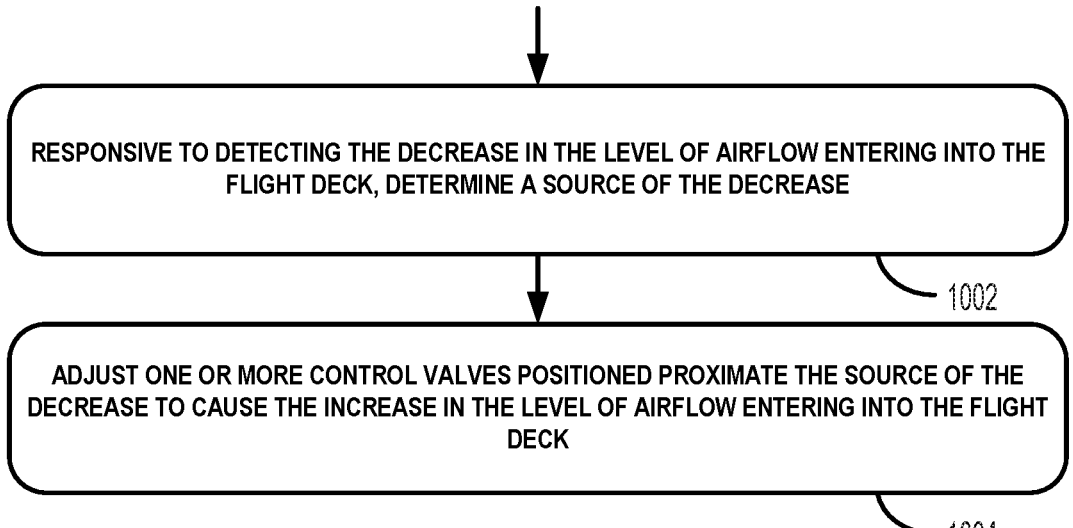
FIG. 10 shows an additional flowchart of a method for use with the method shown in FIG. 5, according to an example implementation.

FIG. 10 shows an additional flowchart of a method for use with the method 500, according to an example implementation. Block 1002 involves determining a source of the decrease responsive to detecting the decrease in the level of airflow entering into the flight deck.

Block 1004 involves adjusting one or more control valves positioned proximate the source of the decrease to cause the increase in the level of airflow entering into the flight deck.

In some examples, the source of the decrease may be determined to be a first air source. As such, adjusting one or more control valves positioned proximate the source of the decrease may involve responsively adjusting a particular control valve proximate a second air source to increase the level of airflow entering into the flight deck.

Figure 11:
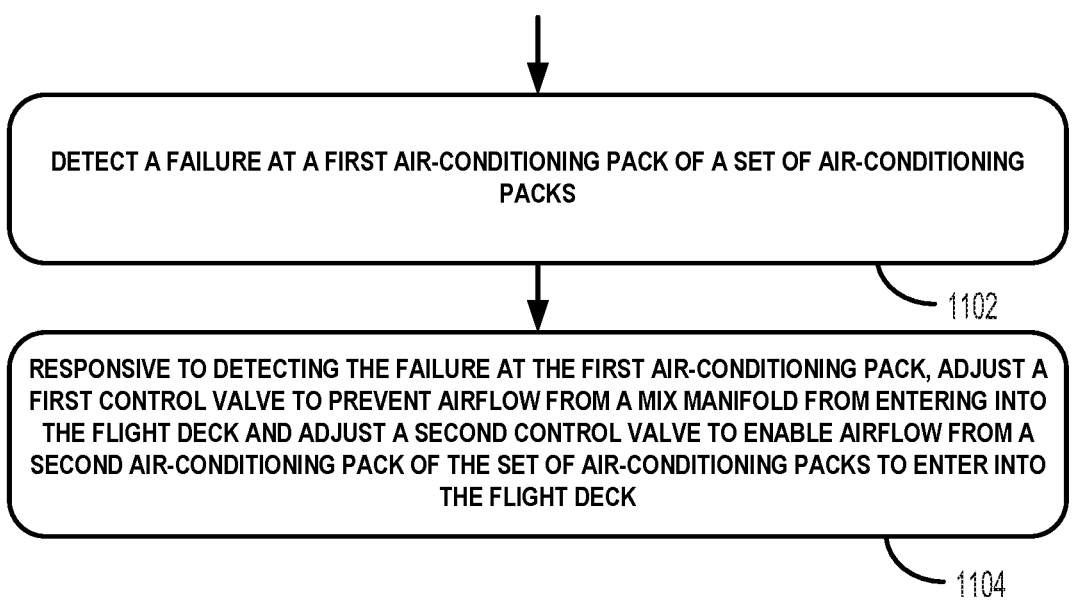
FIG. 11 shows a further flowchart of a method for use with the method shown in FIG. 5, according to an example implementation.

FIG. 11 shows a further flowchart of a method for use with the method 500, according to an example implementation. Block 1102 involves detecting a failure at a first air-conditioning pack of a set of air-conditioning packs. Each air-conditioning pack may be configured to receive air from outside the aircraft and supply the air in a conditioned state as airflow towards the occupancy areas of the aircraft. Block 1104 involves adjusting a first control valve to prevent airflow from a mix manifold from entering into the flight deck and adjusting a second control valve to enable airflow from a second air-conditioning pack of the set of air-conditioning packs to enter into the flight deck responsive to detecting the failure at the first air-conditioning pack.

By the term "substantially" or "about" used herein, it is meant that the recited characteristic, parameter, or value need not be achieved exactly, but that deviations or variations, including for example, measurement error, measurement accuracy limitations, friction, and other factors known to skill in the art, may occur in amounts that do not preclude and/or occlude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system for maintaining outside airflow entering into a flight deck of an aircraft, the system comprising:
   a plurality of air sources, wherein each air source is configured to direct airflow towards occupancy areas of the aircraft, wherein the occupancy areas of the aircraft includes the flight deck and a cabin;
   a control valve configured to enable and disable outside airflow from entering into the flight deck; and
   a computing system configured to:
      detect a decrease in a level of outside airflow entering into the flight deck such that the level of outside airflow is below a threshold level;
      based on detecting the decrease in the level of outside airflow entering into the flight deck below the threshold level, adjust the control valve to cause an increase in the level of outside airflow entering into the flight deck from at least one air source of the plurality of air sources, wherein the at least one air source is an air-conditioning pack configured to receive air from outside the aircraft and supply the air as outside airflow toward the occupancy areas of the aircraft; and
      cause a boost fan to propel the outside airflow supplied by the air-conditioning pack away from entering into the cabin and towards the flight deck.

2. The system of claim 1, further comprising:
   a flow sensor configured to measure the level of outside airflow entering into the flight deck; and
   wherein the computing system is further configured to:
      detect the decrease in the level of outside airflow entering into the flight deck using the flow sensor.

3. The system of claim 1, wherein the computing system is further configured to:
   detect, using a sensor, noxious gas in a cabin of the aircraft; and
   based on detecting the noxious gas in the cabin, adjust a particular control valve to prevent airflow having the noxious gas from entering into the flight deck from the cabin.

4. The system of claim 1, wherein the computing system is further configured to:
   detect the decrease in the level of outside airflow entering into the flight deck; and
   based on detecting the decrease in the level of outside airflow entering into the flight deck, adjust a particular control valve to enable an increase of outside airflow directed towards the flight deck from at least one air source of the plurality of air sources.

5. The system of claim 1, wherein the plurality of air sources further comprises:
   a fan configured to recirculate airflow from the cabin and into the flight deck; and
   wherein the computing system is further configured to disable the fan to prevent recirculated cabin airflow from entering into the flight deck.

6. The system of claim 1, wherein the computing system is further configured to:
   responsive to detecting the decrease in the level of outside airflow entering into the flight deck, determine a source of the decrease; and
   adjust one or more control valves proximate the source of the decrease to cause the increase in the level of outside airflow entering into the flight deck.

7. The system of claim 6, wherein the computing system is further configured to:
   determine that the source of the decrease corresponds to a first air source; and
   responsively adjust at least one control valve proximate a second air source to increase the level of outside airflow entering into the flight deck.

8. A method for maintaining outside airflow entering into a flight deck of an aircraft comprising:
   detecting, at a computing system, a decrease in a level of outside airflow entering into the flight deck such that the level of outside airflow is below a threshold level, wherein the aircraft includes a plurality of air sources with each air source configured to direct airflow towards occupancy areas of the aircraft, wherein the occupancy areas of the aircraft includes the flight deck and a cabin;
   based on detecting the decrease in the level of outside airflow entering into the flight deck below the threshold level, adjusting a control valve to cause an increase in the level of outside airflow entering into the flight deck from at least one air source of the plurality of air sources, wherein the at least one air source is an air-conditioning pack configured to receive air from outside the aircraft and supply the air as outside airflow toward the occupancy areas of the aircraft, and wherein the control valve is configured to enable and disable airflow from entering into the flight deck; and causing, by the computing system, a boost fan to propel the outside airflow supplied by the air-conditioning pack away from entering into the cabin and towards the flight deck.

9. The method of claim 8, wherein detecting the decrease in the level of outside airflow entering into the flight deck comprises:
detecting the decrease based on measurements from a plurality of sensors.

10. The method of claim 8, wherein detecting the decrease in the level of outside airflow entering into the flight deck comprises:
detecting the decrease using a flow sensor, wherein the flow sensor is configured to measure the level of outside airflow entering into the flight deck.

11. The method of claim 8, further comprising:
detecting, using a sensor, noxious gas in a cabin of the aircraft; and
based on detecting the noxious gas in the cabin, adjusting a first control valve to prevent airflow having the noxious gas from entering into the flight deck from the cabin.

12. The method of claim 11, further comprising:
responsive to adjusting the first control valve, detecting the decrease in the level of outside airflow entering into the flight deck; and
based on detecting the decrease in the level of outside airflow entering into the flight deck, adjusting a second control valve to enable an increase of outside airflow directed towards the flight deck from a second air-conditioning pack,
wherein the second air-conditioning pack is configured to receive air from outside the aircraft and supply the air in a conditioned state as outside airflow towards the flight deck and cabin.

13. The method of claim 8, further comprising:
responsive to detecting the decrease in the level of outside airflow entering into the flight deck, determining a source of the decrease; and
adjusting one or more control valves positioned proximate the source of the decrease to cause the increase in the level of outside airflow entering into the flight deck.

14. The method of claim 13, wherein determining the source of the decrease comprises:
determining that the source of the decrease corresponds to a first air source; and
wherein adjusting one or more control valves positioned proximate the source of the decrease to cause the increase in the level of outside airflow entering into the flight deck comprises:
responsively adjusting a particular control valve proximate a second air source to increase the level of outside airflow entering into the flight deck.

15. A non-transitory computer readable medium having stored therein instructions executable by one or more processors to cause a computing system to perform functions comprising:
detecting a decrease in a level of outside airflow entering into a flight deck of an aircraft such that the level of outside airflow is below a threshold level, wherein the aircraft includes a plurality of air sources with each air source configured to direct airflow towards occupancy areas of the aircraft, wherein the occupancy areas of the aircraft includes the flight deck and a cabin;
based on detecting the decrease in level of outside airflow entering into the flight deck below the threshold level, adjusting a control valve to cause an increase in the level of outside airflow entering into the flight deck from at least one air source of the plurality of air sources, wherein the at least one air source is an air-conditioning pack configured to receive air from outside the aircraft and supply the air as outside airflow toward the occupancy areas of the aircraft, and wherein the control valve is configured to enable and disable airflow from entering into the flight deck; and
causing a boost fan to propel the outside airflow supplied by the air-conditioning pack away from entering into the cabin and towards the flight deck.

16. The non-transitory computer readable medium of claim 15, further comprising:
detecting, using a sensor, noxious gas in a cabin of the aircraft; and
based on detecting the noxious gas in the cabin, adjusting a first control valve to prevent airflow having the noxious gas from entering into the flight deck from the cabin.

17. The non-transitory computer readable medium of claim 15, further comprising:
detecting a failure at a first air-conditioning pack of a set of air-conditioning packs, wherein each air-conditioning pack is configured to receive air from outside the aircraft and supply the air in a conditioned state as outside airflow towards occupancy areas of the aircraft; and
responsive to detecting the failure at the first air-conditioning pack, adjusting a first control valve to prevent airflow from a mix manifold from entering into the flight deck and adjusting a second control valve to enable outside airflow from a second air-conditioning pack of the set of air-conditioning packs to enter into the flight deck.

18. The system of claim 1, wherein the computing system is further configured to:
adjust a second control valve to cause an increase in the level of outside airflow entering into the flight deck from a set of air-conditioning packs.

19. The system of claim 1, wherein the computing system is further configured to:
responsive to detecting the decrease in the level of outside airflow entering into the flight deck below the threshold level, provide, using a user interface, one or more suggested actions for a pilot to review, wherein each suggested action represents a modification that increases the level of outside airflow entering into the flight deck.

20. The system of claim 1, wherein the threshold level depends on a type of the aircraft.

* * * * *